(12) United States Patent
Ohta et al.

(10) Patent No.: US 8,177,409 B2
(45) Date of Patent: May 15, 2012

(54) LIGHT GUIDE SHEET AND ELECTRONIC EQUIPMENT UTILIZING THE SAME

(75) Inventors: Hirotoshi Ohta, Aichi (JP); Kitaaki Ohmori, Aichi (JP)

(73) Assignee: Fuji Polymer Industries Co., Ltd., Nagoya-shi, Aichi (JP)

( * ) Notice: Subject to any disclaimer, the term of this patent is extended or adjusted under 35 U.S.C. 154(b) by 406 days.

(21) Appl. No.: 12/516,163

(22) PCT Filed: Nov. 15, 2007

(86) PCT No.: PCT/JP2007/072198
§ 371 (c)(1),
(2), (4) Date: May 22, 2009

(87) PCT Pub. No.: WO2008/062713
PCT Pub. Date: May 29, 2008

(65) Prior Publication Data
US 2010/0067254 A1  Mar. 18, 2010

(30) Foreign Application Priority Data

Nov. 24, 2006   (JP) .................................. 2006-317463

(51) Int. Cl.
*F21V 7/04* (2006.01)
*F21V 8/00* (2006.01)
(52) U.S. Cl. ......... 362/615; 362/606; 362/558; 362/629
(58) Field of Classification Search .................. 362/606, 362/558, 615–629
See application file for complete search history.

(56) References Cited

U.S. PATENT DOCUMENTS

| 4,460,940 A | * | 7/1984 | Mori | 362/558 |
| 5,134,549 A | * | 7/1992 | Yokoyama | 362/623 |
| 5,428,468 A | * | 6/1995 | Zimmerman et al. | 349/62 |
| 5,947,578 A | * | 9/1999 | Ayres | 362/629 |

(Continued)

FOREIGN PATENT DOCUMENTS

JP    63-62104    3/1988

(Continued)

OTHER PUBLICATIONS

Jujo Technical Information, 100 Series Super Gloss Ink, Aug. 2008, Jujo Chemical Co.,Ltd.. ( 3 pages) www.jujo-chemical.co.jp/j/zaishitsa_suisen/zaishitsu_suisen12.html. partial translation (1 page).

*Primary Examiner* — Bao Q Truong
(74) *Attorney, Agent, or Firm* — Hamre, Schumann, Mueller & Larson, P.C.

(57) ABSTRACT

A light guide sheet of the present invention includes a silicone rubber sheet 1 and plural printed mark parts 3a to 3d printed on the front surface of the silicone rubber sheet 1. The silicone rubber sheet 1 has a visible light transmittance of 80 to 99% and is provided at an end face thereof with a light incidence portion 2a allowing light to be incident upon the interior of the silicone rubber sheet 1. The light guide sheet is capable of causing the light incident upon the interior of the silicone rubber sheet 1 from the light incidence portion 2a to be diffused by the printed mark parts 3a to 3d, and pass through the printed mark parts 3a to 3d, thereby guiding the light outside from the printed mark parts 3a to 3d.

10 Claims, 2 Drawing Sheets

U.S. PATENT DOCUMENTS

| | | | |
|---|---|---|---|
| 5,951,138 A * | 9/1999 | Ishikawa | 362/620 |
| 7,314,652 B2 * | 1/2008 | Hay et al. | 362/600 |
| 7,677,781 B2 | 3/2010 | Ishihara et al. | |

FOREIGN PATENT DOCUMENTS

| | | |
|---|---|---|
| JP | 5-45651 | 2/1993 |
| JP | 6-36162 | 5/1994 |
| JP | 8-185755 | 12/1994 |
| JP | 7-10701 | 2/1995 |
| JP | 3025080 | 11/1995 |
| JP | 10-197725 | 7/1998 |
| JP | 2001-93319 | 4/2001 |
| JP | 2001-155576 | 6/2001 |
| JP | 2001-167655 | 6/2001 |
| JP | 2004-69751 | 3/2004 |
| JP | 2005-066914 | 3/2005 |
| JP | 2005-129249 | 5/2005 |
| WO | 2006/115113 | 11/2006 |

* cited by examiner

LIGHT GUIDE SHEET AND ELECTRONIC EQUIPMENT UTILIZING THE SAME

TECHNICAL FIELD

The present invention relates to a light guide sheet useful for illuminating, for example, an operation key or an operation panel of a mobile telephone, a personal digital assistant (PDA), a calculator, or the like, and electronic equipment utilizing the light guide sheet.

BACKGROUND ART

For enabling the use in the nighttime or dark places, illuminating an operation key or an operation panel of portable electronic equipment such as a mobile telephone, a personal digital assistant (PDA), or a calculator is essential. On the other hand, such portable electronic equipment preferably consumes less power for illuminating an operation key so as to prevent battery depletion. For such reasons, the use of a light-emitting diode (LED) as an illumination source is proposed (Patent documents 1 and 2). These documents disclose devices having a structure in which one LED is placed for each switch.

However, there is a problem in that the above devices require a number of LEDs, consuming large amounts of power. Furthermore, an LED is placed under each switch, so that there also is a problem of the above devices having a large thickness, which makes it difficult to downsize them.
Patent document 1: JP 07-10701 Y
Patent document 2: JP 06-36162 Y

DISCLOSURE OF INVENTION

Problem to be Solved by the Invention

In order to solve the problems described above, the present invention has an object to provide a light guide sheet that is capable of reducing the number of LEDs used in electronic equipment and also downsizing electronic equipment, and electronic equipment utilizing the light guide sheet.

Means for Solving Problem

A light guide sheet of the present invention includes a silicone rubber sheet and plural printed mark parts printed on the front surface of the silicone rubber sheet. The silicone rubber sheet has a visible light transmittance of 80 to 99% and is provided at an end face thereof with light incidence portions, allowing light to be incident upon the interior of the silicone rubber sheet. The light guide sheet is capable of causing the light incident upon the interior of the silicone rubber sheet from the light incidence portions to be diffused by the printed mark parts and pass through the printed mark parts, thereby guiding the light from the printed mark parts to the outside.

Electronic equipment of the present invention includes the light guide sheet of the present invention, a light source disposed adjacent to the light incidence portion, a key-switch disposed on the front surface side of the silicone rubber sheet of the light guide sheet, a circuit board disposed on a side of the light guide sheet opposite to the key-switch, and a metal dome disposed between the light guide sheet and the circuit board.

DETAILED DESCRIPTION OF THE PREFERRED EMBODIMENTS

In the present invention, a silicone rubber sheet having a visible light transmittance of 80 to 99% is employed. Examples of silicone rubber constituting the silicon rubber sheet include heat-curable millable rubber, heat-curable liquid rubber, and silicone gel, and among them, heat-curable liquid rubber is preferable. Examples of the cross-linking mechanism of silicone rubber constituting the silicone rubber sheet include organic peroxide type cross-linking, and addition reaction type cross-linking, and the addition reaction type cross-linking is preferable. Physical properties of the silicone rubber after cross-linking preferably are as follows: a hardness (JIS-K6253 compliant, A-type hardness) of 50 to 95; a tensile strength (JIS-K6251) of 2 MPa or more; and an elongation (JIS-K6251) of 20% or more.

For forming the silicone rubber sheet having a visible light transmittance of 80 to 99%, for example, a transparent rubber material containing no filler and the like is used. However, the transparent rubber material may contain additives such as a heat-resisting agent, a flame retardant, an antimicrobial agent, and a fungicide as long as the object of the present invention is not impaired. An example of a method for forming a silicone rubber sheet will be described below.

First, for example, a solution obtained by mixing a silicone rubber raw material with a cross-linking agent uniformly is cast onto a resin film such as a polyethylene terephthalate (PET) film to form a membrane. Then, another PET film is placed on the membrane. The membrane sandwiched between two PET films is heated in an atmosphere of, for example, 120° C. for 20 minutes to cross-link the silicone rubber raw material. This membrane is used as a silicone rubber sheet. The average thickness of the silicone rubber sheet is not particularly limited as long as it keeps a visible light transmittance of 80 to 99% and may be selected appropriately depending upon the intended use; but is preferably in the range of 0.10 to 1.00 mm, and more preferably in the range of 0.20 to 0.80 mm. The silicone rubber sheet is formed in a predetermined shape by cutting or the like depending upon the intended use.

Figure 1:
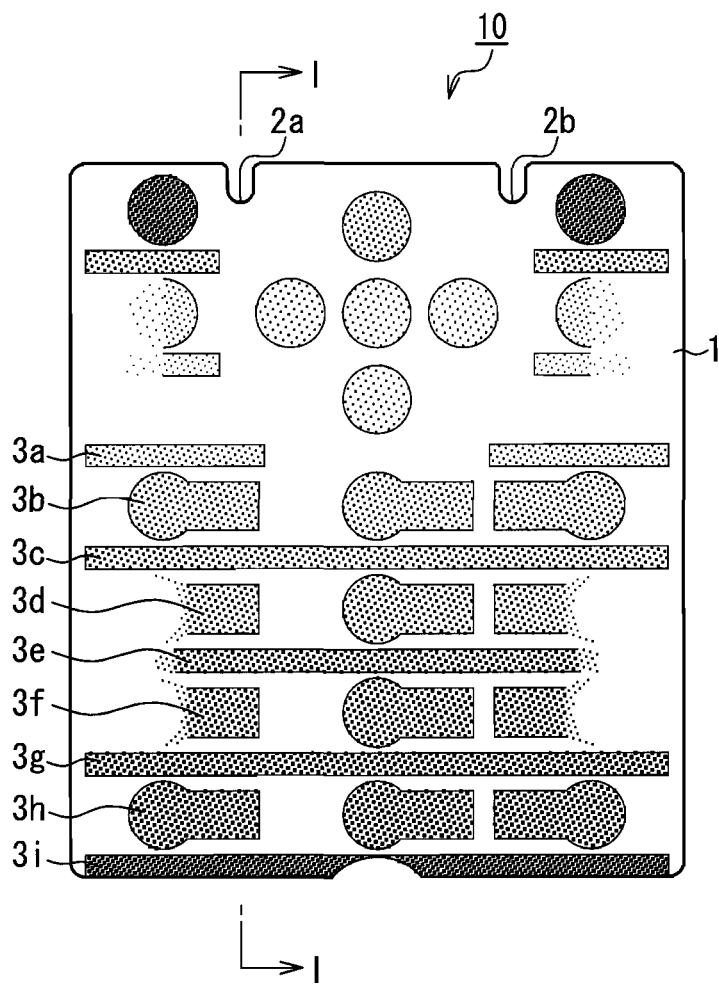
FIG. 1 is a plan view showing an example of a light guide sheet of the present invention.

Hereinafter, one example of the present invention will be described with reference to the drawings. FIG. 1 is a plan view showing an example of a light guide sheet of the present invention. One end face of a silicone rubber sheet 1 constituting a light guide sheet 10 includes, as light incidence portions 2a and 2b, portions recessed toward the center of the silicone rubber sheet. In the electronic equipment utilizing the light guide sheet 10, light-emitting sources such as LEDs are placed adjacent to the light incidence portions 2a and 2b. The light incidence portions 2a and 2b easily can be formed by a method such as cutting or the like.

The front surface (one principal plane) of the silicone rubber sheet 1 is printed with plural printed mark parts 3a to 3i formed in desired shapes. Each printed mark part is capable of guiding the light incident upon the interior of the silicone rubber sheet 1 from the light incident areas 2a and 2b outside of the silicone rubber sheet and guiding the light incident upon the printed mark parts outside therefrom i.e. outside from the light guide sheet. More specifically, each printed mark part contains a base material and light-diffusing particles dispersed in the base material. It is preferable that the base material contains, as a main component, a material with a refractive index similar to that of silicone rubber constituting the silicone rubber sheet 1, in particular, silicone rubber. The printing method is not particularly limited, but screen printing is preferable.

A preferred printing ink for forming printed mark parts is, for example, silicone-based ink that contains light-diffusing particles. The silicone-based ink contains, for example, the above-mentioned light-diffusing particles and silicone rubber such as heat-curable liquid rubber. Such silicone-based ink further may contain additives such as a heat-resisting agent, a flame retardant, an antimicrobial agent, and a fungicide as long as the object of the present invention is not impaired. The printing ink is used after being mixed with, for example, a curing agent. Examples of the light-diffusing particles include titanium oxide, calcium carbonate, and barium sulfate, although these are not particularly limited as long as they are particles capable of diffusing the light that has entered the printed mark parts 3a to 3i through the silicone rubber sheet. The printing ink and the printed mark parts 3a to 3i may contain one or more types of the light-diffusing particles. The average particle size of the light-diffusing particles is not particularly limited as long as they are capable of diffusing the light that has entered the printed mark parts 3a to 3i through the silicone rubber sheet, but is suitably 20 μm or less, for example, and preferably in the range of 1 to 10 μm for satisfactory printing. The amount of the light-diffusing particles to be added to the silicone rubber will vary depending upon the type and average particle size, and may be determined appropriately within the range in which a light-diffusing effect is achieved and the rubber elasticity of the printed mark parts is not impaired.

In order to enhance the uniformity of brightness of light emitted from the light-emitting surface of the light guide sheet 10, the plural printed mark parts preferably are formed so as to satisfy at least one of the following items (a) to (0:
(a) Regarding the plural printed mark parts, the printed mark part positioned farther from the light incidence portions has a larger shield area. Herein, the shield area refers to a contact area of each printed mark part and the silicone rubber sheet.
(b) Regarding the plural printed mark parts, the printed mark part positioned farther from the light incidence portions is thicker.
(c) Regarding the plural printed mark parts, the printed mark part positioned farther from the light incidence portions contains the light-diffusing particles in a higher concentration.

Each printed mark part may be composed of a single mark or may be composed of, for example, plural dot-shaped marks. When each printed mark part is composed of plural dot-shaped marks, for example, the area of a dot-shaped mark positioned farther from the light incidence portions can be set to be larger than that of a dot-shaped mark positioned closer to the light incidence portions in one printed mark part. This is preferable because the control for enhancing the uniformity of brightness of light emitted from the light-emitting surface of the light guide sheet becomes easier.

Figure 2:
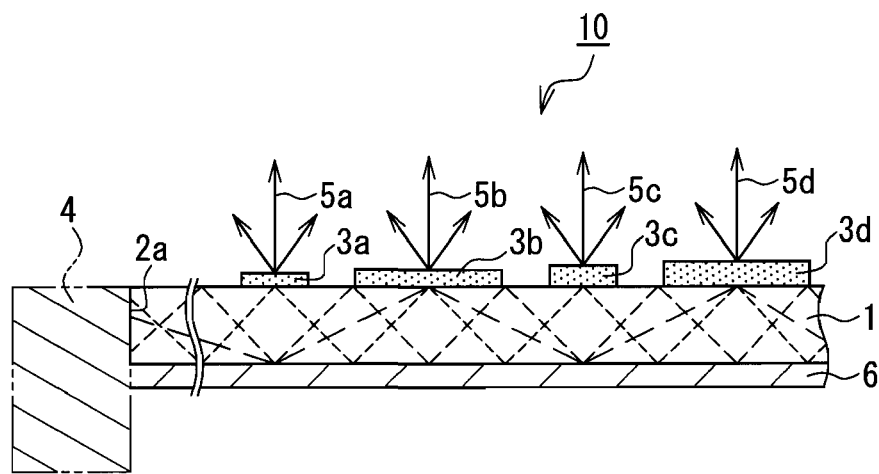
FIG. 2 is a sectional view taken along a line I-I in FIG. 1.

FIG. 2 is a sectional view taken along a line I-I in FIG. 1. The light emitted from an LED 4 is incident upon the interior of the silicone rubber sheet 1 through the light incidence portion 2a, is diffused by the printed mark parts 3a to 3d, and passes through the printed mark parts 3a to 3d, whereby the light, for example, indicated by arrows 5a to 5d, can be extracted from the printed mark parts 3a to 3d. It is preferred that a reflection film 6 is placed in contact with a reverse surface (back surface) of the silicone rubber sheet 1. In this case, the reverse surface (back surface) of the silicone rubber sheet 1 will work as a high reflecting surface and inhibit the attenuation of the light incident from the light incidence portion 2a, so that the light can be extracted efficiently to the front surface side of the silicone rubber sheet 1. An aluminum-evaporated film, for example, can be used as the reflection film 6.

If an operation panel or the like of a mobile telephone, for example, is placed over the printed mark parts 3a to 3d, pushbuttons of the operation panel can be illuminated brightly. In the example shown in FIG. 1, the use of only two LEDs per operation panel can illuminate all the pushbuttons brightly, and thus, the power consumption also can be suppressed.

Figure 3:
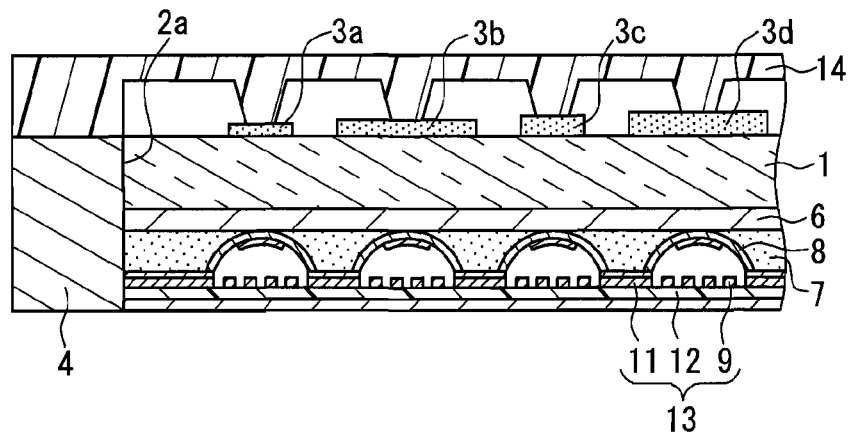
FIG. 3 is a sectional view showing an example of a mobile telephone utilizing one example of the light guide sheet of the present invention.

FIG. 3 is a sectional view showing one example of a mobile telephone utilizing the light guide sheet of the present invention. The silicone rubber sheet 1 of the light guide sheet is disposed adjacent to the light-emitting diode (LED) 4. The light emitted from the LED 4 is incident upon the silicone rubber sheet 1, and the light incident upon the interior of the silicone rubber sheet 1 is diffused by the printed mark parts 3a to 3d, and passes through the printed mark parts 3a to 3d, thereby being extracted to the outside of the light guide sheet from the printed mark parts 3a to 3d. The extracted light is then radiated toward the reverse surface of a key-switch 14, thus illuminating numbers and symbols on the key-switch 14.

Referring now to FIG. 3, the reflection film layer 6 is placed in contact with the reverse surface of the silicone rubber sheet 1. On a side of the reflection film layer 6 opposite to the silicone rubber sheet 1, a pressure-sensitive adhesive layer 7, metal domes 8, and a printed-circuit board 13 are arranged in this order. The printed-circuit board 13 includes, for example, a substrate 12 and wiring layers 9, 11 formed thereon. When the key-switch 14 is pressed, the applied force is transmitted to the metal domes 8 via the light guide sheet and squashes the metal domes 8, and a metal layer forming the metal domes 8 comes into contact with the wiring layer 9 of the printed-circuit board 13, whereby an input signal is given to electronic equipment.

As described above, the light guide sheet of the present invention employs a silicone rubber sheet with a high visible light transmittance, which allows light to be incident upon the interior of the silicone rubber sheet from an end face thereof. The plural printed mark parts printed on the front surface of the silicone rubber sheet are capable of diffusing the light, which is then to be extracted from each printed mark part. Accordingly, the electronic equipment including the light guide sheet of the present invention can reduce the number of LEDs installed therein and enhance the uniformity of brightness of light emitted from the light-emitting surface of the light guide sheet. Further, the thickness of a light-emitting part of such electronic equipment can be reduced. As a result, electronic equipment such as a mobile telephone can be downsized.

EXAMPLES

The present invention will be described more specifically by way of the following examples.

Example 1

(1) Formation of Silicone Rubber Sheet

Two liquids of liquid silicone rubber ("KE1935A" and "KE1935B" (product name): two-pack type, manufactured by Shin-Etsu Chemical Co., Ltd) were mixed and stirred in the ratio of 1:1 by weight, and the mixture thus obtained was thoroughly vacuum-defoamed with a vacuum-defoaming machine. The resultant mixture then was cast on a film separator "No. 042" (silicone-based pressure-sensitive adhesive separator (product name), manufactured by Teraoka Seisakusho Co., Ltd., substrate: polyester film #50,) so that no foam was contained in the mixture. Another film separator "No. 042" was placed thereon, and thereafter, the mixture sandwiched between two film separators was rolled to a predetermined thickness with constant velocity rolls. Next, the rolled uncured sheet was heat-cured in a hot air circulating oven at 120° C. for 20 minutes, and then, the upper and lower film separators were peeled off from the cured sheet, whereby a cured silicone rubber sheet with an average thickness of 0.30 mm was obtained.

The properties of the obtained silicone rubber sheet were as follows: a visible light transmittance of 90% (a transmittance of 90% with respect to any light in a wavelength range of 380 to 780 nm); a hardness (JIS-K6253 compliant, A-type hardness meter) of 55; a tensile strength (JIS-K6251 compliant) of 6 MPa; and an elongation (JIS-K6251 compliant) of 350%.

(2) Printing of Silicone Rubber Sheet

Ten parts by weight of a curing agent ("PRK-3 WHITE CAT-A" (product name), manufactured by Dow Corning Dray Co., Ltd.) was mixed and stirred uniformly with respect to 100 parts by weight of silicone printing ink ("PRK-3 WHITE" (product name), manufactured by Dow Corning Dray Co., Ltd.). After that, the mixture thus obtained was vacuum-defoamed thoroughly with a vacuum-defoaming machine. Then, the mixture was screen-printed onto predetermined positions of a silicone rubber sheet. The thickness of the printed parts (after dried) was adjusted to be in the range of 20 μm±5 μm. The printed ink then was heat-cured in a hot air circulating oven at 150° C. for 30 minutes. The screen used in the screen printing was obtained by attaching a polyester screen (250-mesh) coated with an emulsifier to an aluminum frame and peeling off the emulsifier in plural dot-shapes to create plural openings. The dot-shaped openings in the screen were designed to be smaller toward the light incidence portions of the silicone rubber sheet and to be larger with distance from the light incidence portions.

Figure 4:
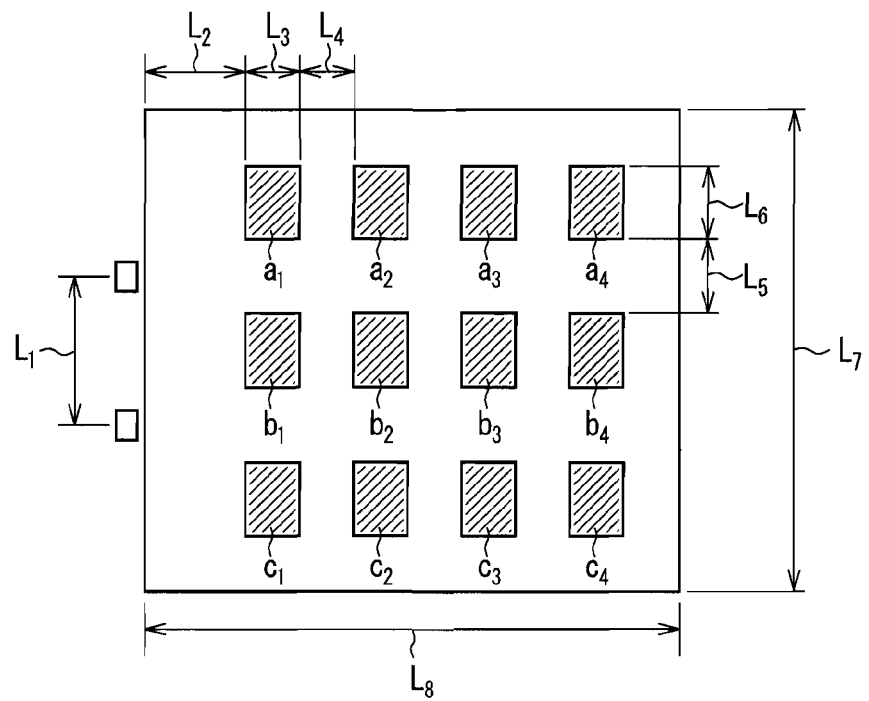
FIG. 4 is an explanatory view illustrating the conditions for brightness measurement of light guide sheets in examples and comparative examples.

As illustrated in FIG. 4, an LED spacing $L_1$ was set to 20 mm. The respective dimensions of the light guide sheet obtained in the above process were set to be $L_2$: 10 mm, $L_3$: 5 mm, $L_4$: 5 mm, $L_5$: 5 mm, $L_6$: 10 mm, $L_7$: 50 mm, and $L_8$: 50 mm. Also, Table 1 shows the printed conditions of printed mark parts $a_1$ to $c_4$. Values in Table 1 indicate the shield area ratios of the printed mark parts $a_1$ to $c_4$ by dot-printing per unit area (1 cm$^2$) in FIG. 4.

TABLE 1

| Shield area ratio (%) by dot-printing per unit area (1 cm$^2$) | | | |
| --- | --- | --- | --- |
| $a_1$:15 | $a_2$:35 | $a_3$:55 | $a_4$:80 |
| $b_1$:10 | $b_2$:30 | $b_3$:50 | $b_4$:75 |
| $c_1$:15 | $c_2$:35 | $c_3$:55 | $c_4$:80 |

By irradiating the interior of the light guide sheet with light from two LEDs ("NSSW020A, White LED" (product name), manufactured by Nichia Corporation), the brightness was measured using a brightness meter ("CA-2000" (product name), manufactured by Konica Minolta Holdings, Inc.). The result obtained was 38-47 cd/m$^2$ on the upper surfaces of the printed mark parts $a_1$ to $c_4$. The brightness measurement was conducted by opposing the light-receiving surface of the brightness meter to the surface of a transparent sheet with the printed mark parts printed thereon, and scanning the upper sides of the printed mark parts $a_1$ to $c_4$ sequentially by a brightness meter to measure the brightness of light emitted from the light-emitting surface of the light guide sheet. The distance between the light-receiving surface of the brightness meter and the transparent sheet was set to 250 mm (This also applies to Examples 2 and 3, and Comparative Example 1).

Next, as illustrated in FIG. 3, the obtained light guide sheet was incorporated inside a mobile telephone. As a result, the use of only two LEDs was able to illuminate all the pushbuttons brightly, suppressing the power consumption.

The average thickness of the silicone rubber sheet 1 was set to be 0.30 mm, the thickness (after dried) of the printed mark parts $a_1$ to $c_4$ was set to be 17 to 25 μm, the thickness of the reflection film layer 6 was set to be 100 μm, and the thickness of the pressure-sensitive adhesive layer 7 was set to be 30 to 40 μm (see FIG. 3). The average thickness of the silicone rubber sheet 1 was a value obtained by averaging the thicknesses at 5 points measured by a micrometer specified under JIS B 7052.

Example 2

A light guide sheet was obtained in the same manner as in Example 1, expect that the average thickness of the silicone rubber sheet 1 was set to 0.15 mm.

The brightness was measured in the same manner as in Example 1, which resulted in 32-45 cd/m$^2$.

Example 3

A light guide sheet was obtained in the same manner as in Example 1, expect that the visible light transmittance of the silicone rubber sheet (average thickness: 0.30 mm) was set to 80%.

The brightness was measured in the same manner as in Example 1, which resulted in 25-45 cd/m$^2$.

Comparative Example 1

A light guide sheet was obtained in the same manner as in Example 1, expect that the visible light transmittance of the silicone rubber sheet (average thickness: 0.30 mm) was set to 78%.

The brightness was measured in the same manner as in Example 1, which resulted in 8-40 cd/m$^2$.

Table 2 shows the above results.

TABLE 2

| Experiment No. | Visible light transmittance (%) | Average thickness of silicone rubber sheet (mm) | Brightness (cd/m$^2$) |
| --- | --- | --- | --- |
| Example 1 | 90 | 0.30 | 38-47 |
| Example 2 | 90 | 0.15 | 32-45 |
| Example 3 | 80 | 0.30 | 25-45 |
| Comparative Example 1 | 78 | 0.30 | 8-40 |

The experimental results described above revealed that, when the silicone rubber sheet had a visible light transmittance of 80% or more, the uniformity of brightness of light emitted from the light-emitting surface of the light guide sheet was significantly improved. It was further confirmed that when the silicone rubber sheet had a visible light transmittance of 90% or more, the uniformity of brightness of light emitted from the light-emitting surface of the light guide sheet was improved more significantly.

INDUSTRIAL APPLICABILITY

According to the present invention, it is possible to provide a light guide sheet that is capable of reducing the number of LEDs used in electronic equipment and also downsizing electronic equipment and to provide electronic equipment utilizing the light guide sheet.

The invention claimed is:

1. A light guide sheet comprising:
   a silicone rubber sheet; and
   plural printed mark parts printed on a front surface of the silicone rubber sheet,
   wherein the silicone rubber sheet has a visible light transmittance of 80 to 99%,
   the silicone rubber sheet has a light incidence portion that allows light to be incident upon an interior of the silicone rubber sheet at an end face thereof,
   the light incident upon the interior of the silicone rubber sheet from the light incidence portion is diffused by the printed mark parts, and passes through the printed mark parts, thereby being guided from the printed mark parts to outside,
   the silicone rubber sheet is obtained by heat-curing heat-curable liquid rubber,
   the printed mark parts contain a base material and light-diffusing particles dispersed in the base material, the base material being obtained by heat-curing heat-curable liquid silicone rubber, the base material having a refractive index similar to that of the silicone rubber sheet.

2. The light guide sheet according to claim 1, wherein the silicone rubber sheet has a visible light transmittance of 90% or more.

3. The light guide sheet according to claim 1, wherein an average thickness of the silicone rubber sheet is in a range of 0.10 to 1.00 mm.

4. The light guide sheet according to claim 1, wherein each printed mark part is composed of plural dot-shaped marks.

5. The light guide sheet according to claim 1, wherein assuming that a contact area of each printed mark part and the silicone rubber sheet is a shield area, the plural printed mark parts are arranged so that the shield area of the printed mark part positioned farther from the light incidence portion is larger.

6. The light guide sheet according to claim 1, wherein the plural printed mark parts are arranged so that the printed mark part positioned farther from the light incidence portion is thicker.

7. The light guide sheet according to claim 1, wherein the plural printed mark parts are arranged so that the printed mark part positioned farther from the light incidence portion contains the light-diffusing particles in a higher concentration.

8. The light guide sheet according to claim 1, wherein the light incident upon the interior of the silicone rubber sheet from the light incidence portion is light from a light-emitting diode (LED).

9. Electronic equipment comprising:
   the light guide sheet according to claim 1;
   a light source disposed adjacent to the light incidence portion,
   a key-switch disposed on a front surface side of the silicone rubber sheet of the light guide sheet;
   a circuit board disposed on a side of the light guide sheet opposite to the key-switch; and
   a metal dome disposed between the light guide sheet and the circuit board.

10. The electronic equipment according to claim 9, wherein the light source is a light-emitting diode (LED).

* * * * *